Oct. 15, 1957  J. L. CALLAHAN  2,809,961
PROCESS FOR SEPARATING A REACTION SLURRY
Filed Jan. 13, 1953
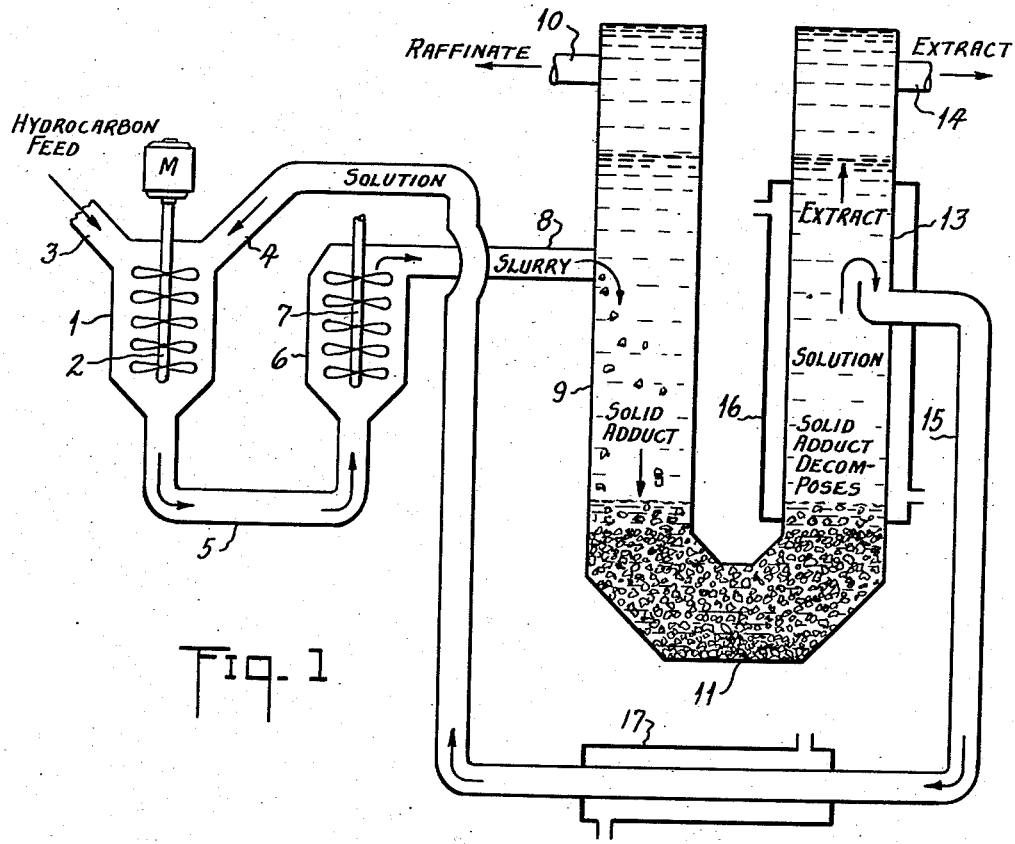
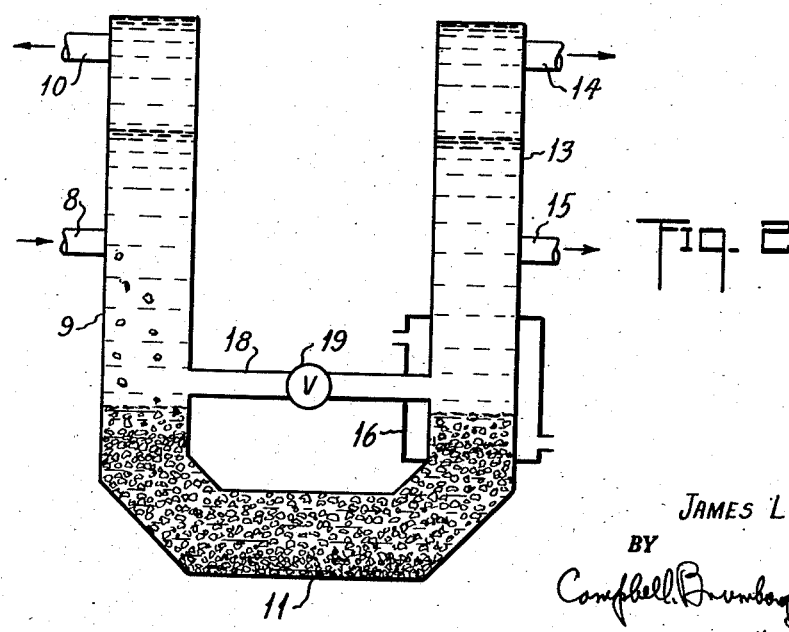
INVENTOR.
JAMES L. CALLAHAN
BY
HIS ATTORNEYS

United States Patent Office 2,809,961
Patented Oct. 15, 1957

2,809,961

PROCESS FOR SEPARATING A REACTION SLURRY

James L. Callahan, Bedford, Ohio, assignor to The Standard Oil Company, Cleveland, Ohio, a corporation of Ohio Application January 13, 1953, Serial No. 331,038

2 Claims. (Cl. 260—96.5)

The present invention relates to a method and apparatus for the recovery and separation of a reaction slurry and includes a continuous method for separating a reaction slurry and recycling a component to the reaction. In a particular aspect the method and apparatus of this invention are useful for separating into its individual components a reaction slurry that has been formed by the contacting of urea or a derivative thereof with a mixture of hydrocarbons.

There has recently been devised and published a number of processes for separating by adduct formation a mixture of compounds into its different components. In particular, one of such processes comprises the contacting of a hydrocarbon mixture with a solution of an adduct-forming urea compound (urea or a urea derivative such as thiourea, tellurourea or selenourea) whereby the urea or derivative selectively forms a solid adduct with one or more of the hydrocarbon components of the mixture. There results from the adduct formation a slurry of solid adduct in a liquid comprising a mixture of unreacted hydrocarbons (raffinate) and the solvent in which the urea was originally dissolved. In the past various methods and combinations of apparatus have been proposed and utilized for the recovery and separation of the reaction slurry into its individual components. Generally the first step in such methods involves the separation of the solid adduct from the liquid portion of the reaction slurry by such means as filtration or centrifugation followed by the decomposition of the adduct, usually by heating, into the urea or derivative and the selectively extracted hydrocarbon. The extracted hydrocarbon (or hydrocarbons) may then be isolated from the urea by settling and decantation. From this description in can be seen that the separation of an adduction reaction slurry into its individual components generally involves laborious multi-step procedures employing a plurality of separate pieces of equipment.

It is an object of this invention to provide a method and apparatus for separating an adduct reaction slurry into its individual components which method and apparatus are characterized by simplicity and ease of operation.

It is a further object of the invention to provide a method and an apparatus for separating an adduct reaction slurry into its individual components which method and apparatus eliminate the need for filters or centrifuges.

It is still another object of the invention to provide a continuous method for the separation of an adduct reaction slurry which is more economical and simpler to operate than the prior art methods.

It is another object of the invention to provide an apparatus for separating an adduct reaction slurry into its individual components which apparatus combines into one unit the plurality of apparatus units required by prior art designs.

The invention will be first described in connection with the apparatus since it is believed that this order of presentation will be helpful in contributing to an understanding of the invention.

The apparatus will be described in connection with Fig. 1 and Fig. 2 which are elevations of two embodiments of the apparatus of this invention. In Fig. 1 there is shown a mixing tank 1 equipped with a power driven agitator 2 and with inlet pipes 3 and 4. The tank 1 is connected by means of a conduit 5 with a second mixing tank 6 equipped with an agitator 7. The second mixing tank has an outlet pipe 8 that is connected to the central portion of a vertically elongated vessel 9. Vessel 9 has in turn an outlet pipe 10 affixed to the upper portion thereof and the lower portion of vessel 9 is connected in U-tube fashion by means of conduit 11 to a second vertically elongated vessel 13, both vessels 9 and 13 being positioned at substantially the same horizontal level. Vessel 13 possesses a heating jacket 16, and outlet pipe 14 connected to the upper portion of the vessel and an outlet pipe 15 affixed to the central portion of the vessel. Outlet pipe 15 returns to inlet 4 through cooling jacket 17. While the above description of the apparatus illustrates a complete system for the separation of a mixture of compounds by adduct formation it is to be understood that the present invention is particularly concerned with the combination of vessels 9 and 13 and the appendages thereto including inlet pipe 8, outlet pipes 10, 14 and 15 and heating jacket 16.

The apparatus illustrated in Fig. 2 is another modification of the invention in which vessels 9 and 13 are connected by by-pass 18 at a point below the level of inlet 8 and outlet 15 but above the level of conduit 11. By-pass 18 is equipped with a regulating valve 19.

In operation of the apparatus of Fig. 1, a feed comprising a mixture of compounds is introduced via pipe 3 to mixing tank 1. Simultaneously therewith a solution of an adduct-forming urea compound is introduced to mixing tank 1 via inlet pipe 4. The solution and the mixture of compounds are vigorously agitated in mixing tank 1 and as the volume of feed increases the reaction mixture is transferred via line 5 to the second mixing tank 6 where it is again subjected to agitation. At this point the adduct-forming urea compound has selectively reacted with one or more of the compounds in the feed to form a solid adduct. The slurry resulting from this adduct formation is transferred through line 8 to vessel 9. The rate of slurry input into vessel 9 is so adjusted that time is allowed for the solid adduct to precipitate and for the unreacted compounds (raffinate) to rise to the top of vessel 9. It is preferable in starting the operation that both vessels 9 and 13 be filled at the outset with a solution of the adduct-forming urea compound. As the solid adduct precipitates in the bottom of vessel 9 it assumes a semi-solid state of flocculation and is thus capable of flowing as a liquid. As the volume of adduct increases in the bottom of vessel 9 and the adduct settles in conduit 11 and rises into vessel 13 and due to the nature of the apparatus the adduct tends to seek a constant level between vessels 9 and 13. At the same time that the settling of the adduct is proceeding, the solvent, being intermediate in density between the raffinate and adduct, stratifies in the central portion of vessel 9 and as the volume of solvent increases it settles under the influence of gravity downward through the solid adduct through conduit 11 and rises through the adduct in vessel 13. As the adduct rises in vessel 13 as heretofore described, it is heated by means of heating jacket 16 to the decomposition point of the adduct and as a result the adduct undergoes decompoition in the lower portion of vessel 13, the products of the decomposition being the adduct-forming urea compound and the selectively extracted compound. The adduct-forming urea compound that is liberated by the decomposition is redissolved in the solvent as it gravitates through the adduct and the resultant solution stratifies in the central portion of vessel 13. The extracted compounds that are liberated by the decomposition are relatively low in density and rise to the upper portion of vessel 13 and are drawn off through pipe 14. The solution of adduct-forming urea compound that is formed and stratified in the central portion of vessel 13 is withdrawn through outlet pipe 15 and is returned through cooling jacket 17 to the first mixing tank to be reused in the formation of additional adduct. During passage through cooling jacket 17, the solution is cooled to reaction temperature.

The operation of the apparatus illustrated in Fig. 2 is similar to the operation of the apparatus of Fig. 1. However, this modification (Fig. 2) of the invention is particularly useful when the solid adduct is not sufficiently porous to permit the seepage or settling of solvent through the adduct. In such cases the provision of by-pass 18 permits the solvent to flow directly from one vessel into the other vessel. By suitably regulating valve 19, the flow of adduct and solvent between the vessels may be controlled as desired.

The apparatus of both Figs. 1 and 2 is subject to modification by those skilled in the art. For example, the heating jacket 16 may be replaced by other equivalent heating means such as an internal coil or means for steam injection. Similarly, the cooling jacket 17 may be replaced by an internal coil or other means for cooling.

From the above description of the apparatus and its operation it can be seen that the method of this invention comprises passing an aduct reaction slurry composed of a mixture of raffinate, solid adduct and solvent into a settling zone, withdrawing raffinate from the upper portion of said zone and allowing the solid adduct and solvent to flow under the influence of gravity from the bottom of said settling zone in the bottom of a decomposition zone, decomposing the adduct in said decomposition zone to an adduct-forming urea compound and an extract, withdrawing extract from the upper portion of said decomposition zone and withdrawing a solution of adduct-forming urea compound from the central portion of said decomposition zone.

In order to illustrate the invention the following example is given.

Example 1

The apparatus employed in this example was a combination of two vertically disposed cylindrical vessels connected in U-tube fashion as are vessels 9 and 13 of Fig. 1. One of the vessels was provided with an inlet pipe on the central portion thereof and an outlet pipe on the upper portion thereof. The second of the vessels was provided with a heating jacket and with outlet pipes at the central portion and at the upper portion. Both vessels were filled with a saturated aqueous methanol solution of urea at 25° C. A reaction slurry which had been prepared by contacting a saturated aqueous methanol solution of urea with Houdry No. 27 gas oil at a temperature of about 25° C. was introduced into the inlet of the first vessel at a relatively slow rate of input. Within the first cylindrical vessel a solid urea adduct quickly precipitated and the unreacted hydrocarbons in the slurry quickly rose to the top portion of the vessel. As the input of slurry increased the adduct began to gravitate into the second cylindrical vessel while at the same time the water-methanol phase of the reaction slurry also gravitated through the adduct and into the second vessel. The second vessel was supplied heat from the heating jacket by means of steam and as the adduct entered the lower portion of the second vessel decomposition began to occur rapidly at a temperature of about 80° C. The extracted hydrocarbon quickly rose to the top of the second vessel and the liberated urea readily dissolved in the aqueous methanol that was present. Within a short time the system had achieved equilibrium so that it was possible to maintain a continuous withdrawal of raffinate from the top of the first vessel, extract from the top of the second vessel and an aqueous methanol solution of urea from the central portion of the second vessel. The aqueous methanol solution of urea was recycled to the formation of additional adduct and was cooled during the recycling to about 25° C.

The term "urea adduct reaction slurry" as used in this specification and claims includes any slurry that has been formed by the contacting of urea or a urea derivative such as thiourea, tellurourea or selenourea with a mixture of hydrocarbons whereby the urea selectively reacts to form a complex with a component of the hydrocarbon mixture. The preparation of such reaction slurries is described in U. S. Patent Nos. 2,499,820; 2,518,677; 2,569,986; and 2,588,602 among others. The urea solvent employed in the preparation of such adduct slurries is usually water or an aqueous solution of an alcohol or similar organic solvent. In some instances it is desirable in the practice of this invention that the reaction slurry contain a wetting agent and/or an electrolyte as taught in U. S. Patent No. 2,518,677 in order to promote clean separation of the components of the reaction slurry.

The reaction slurries may be prepared for subsequent treatment in accordance with this invention from various mixtures of hydrocarbons such as mixtures of branched-chain and straight-chain hydrocarbons or mixtures of other similar hydrocarbons having as one component a hydrocarbon with which urea or a derivative will form an adduct.

Various other modifications in both the apparatus and the method of this invention will be readily apparent to persons skilled in the art. It is intended, however, that the invention be limited only by the scope of the appended claims.

I claim:

1. A method for the gravity separation into its individual components of a urea adduct reaction slurry composed of a mixture of a low specific gravity unreacted liquid raffinate, solid adduct of extract and adduct-forming urea compound, and liquid adduct-forming urea compound solution, both adduct and solution having a higher specific gravity than the raffinate, and the extract having a lower specific gravity than the solution, which comprises passing the slurry into a settling zone, allowing raffinate to rise into the upper portion of said zone to form a raffinate layer, withdrawing raffinate from the layer, allowing the adduct-forming urea compound solution and solid adduct to settle under the influence of gravity to form a layer in the lower portion of the settling zone, and flow from that point into and seek its own level in the lower portion of a decomposition zone on the same level as the settling zone, heating the adduct in the presence of adduct-forming urea compound solution in the upper portion of the decomposition zone to a temperature at which it decomposes to form adduct-forming urea compound and extract, allowing the extract to rise to form a layer above the adduct-forming urea compound solution, withdrawing extract from the layer, and withdrawing adduct-forming urea compound solution from below the extract layer.

2. A method according to claim 1 in which the adduct-forming urea compound solution recovered from the decomposition zone is recycled for the formation of additional urea adduct reaction slurry.

References Cited in the file of this patent

UNITED STATES PATENTS

| | | |
|---|---|---|
| 2,031,987 | Sullivan | Feb. 25, 1936 |
| 2,103,593 | Milliken | Dec. 28, 1937 |
| 2,445,741 | Franz et al. | July 20, 1948 |
| 2,569,986 | Fetterly | Oct. 2, 1951 |
| 2,627,513 | Arey | Feb. 3, 1953 |
| 2,632,002 | Cross | Mar. 17, 1953 |
| 2,640,051 | Lynch | May 26, 1953 |
| 2,672,457 | Weedman | Mar. 16, 1954 |
| 2,676,167 | Findlay et al. | Apr. 20, 1954 |